United States Patent
Nekkanti et al.

(10) Patent No.: US 9,604,156 B2
(45) Date of Patent: Mar. 28, 2017

(54) METHOD AND SYSTEM FOR SEPARATION OF A POLYMER FROM MULTIPLE COMPOUNDS

(71) Applicant: Ticona LLC, Florence, KY (US)

(72) Inventors: Venkata Nekkanti, Florence, KY (US); Michael Haubs, Florence, KY (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 14/481,229

(22) Filed: Sep. 9, 2014

(65) Prior Publication Data

US 2015/0087805 A1 Mar. 26, 2015

Related U.S. Application Data (60) Provisional application No. 61/882,325, filed on Sep. 25, 2013.

(51) Int. Cl.
*C08G 75/14* (2006.01)
*B01D 11/02* (2006.01)
*B03B 5/62* (2006.01)

(52) U.S. Cl.
CPC .......... *B01D 11/0242* (2013.01); *B03B 5/623* (2013.01)

(58) Field of Classification Search
CPC .. C08G 75/025; C08G 75/14; C08G 75/0263; C08G 75/0268; C08G 75/0259; C08G 75/0281; B29B 13/00; C08F 6/008; C08F 6/28; B30B 9/28
USPC ......... 525/537; 528/387, 388, 389; 422/267, 422/186.1, 513, 422
See application file for complete search history.

(56) References Cited

U.S. PATENT DOCUMENTS

| | | |
|---|---|---|
| 3,869,433 A | 3/1975 | Campbell |
| 4,038,259 A | 7/1977 | Campbell et al. |
| 4,038,260 A | 7/1977 | Campbell |
| 4,038,262 A | 7/1977 | Edmonds, Jr. |
| 4,038,263 A | 7/1977 | Edmonds, Jr. et al. |
| 4,039,518 A | 8/1977 | Campbell |
| 4,056,515 A | 11/1977 | Vidaurri, Jr. |
| 4,060,520 A | 11/1977 | Irvin |

(Continued)

FOREIGN PATENT DOCUMENTS

| | | |
|---|---|---|
| EP | 2 322 485 A1 | 5/2011 |
| JP | H07228699 | 8/1995 |

(Continued)

OTHER PUBLICATIONS

International Patent Application No. PCT/US2014/54734; International Search Report and Written Opinion dated Nov. 25, 2014; (7 pages).

(Continued)

*Primary Examiner* — Shane Fang
(74) *Attorney, Agent, or Firm* — Dority & Manning, P.A.

(57) ABSTRACT

Methods, devices, and systems that can be utilized in separating a polymer from other compounds of a polymer formation process are described. The methods utilize multiple sedimentors in a countercurrent flow design in conjunction with different solvent solutions in the multiple sedimentors to separate a product polymer from other compounds of a polymer formation process. The sedimentors include feed inlets that can encourage contact between countercurrent flows and improve mass transfer rates between the countercurrent flows.

46 Claims, 3 Drawing Sheets

(56) References Cited

U.S. PATENT DOCUMENTS

| | | |
|---|---|---|
| 4,064,114 A | 12/1977 | Edmonds, Jr. |
| 4,089,847 A | 5/1978 | Edmonds, Jr. et al. |
| 4,096,132 A | 6/1978 | Edmonds, Jr. |
| 4,370,470 A | 1/1983 | Vidaurri et al. |
| 4,393,197 A | 7/1983 | Edmonds, Jr. |
| 4,451,640 A | 5/1984 | Shiiki et al. |
| 4,457,812 A | 7/1984 | Rado |
| 4,495,332 A | 1/1985 | Shiiki et al. |
| 4,501,902 A | 2/1985 | Cleary |
| 4,514,558 A | 4/1985 | Shiiki et al. |
| 4,537,953 A | 8/1985 | Kawakami et al. |
| 4,613,654 A | 9/1986 | Katto et al. |
| 4,645,826 A | 2/1987 | Iizuka et al. |
| 4,699,975 A | 10/1987 | Katto et al. |
| 4,745,167 A | 5/1988 | Iizuka et al. |
| 4,761,468 A | 8/1988 | Okamoto et al. |
| 4,767,841 A | 8/1988 | Goetz et al. |
| 4,769,442 A | 9/1988 | Iwasaki et al. |
| 4,786,711 A | 11/1988 | Senatore et al. |
| 4,794,164 A | 12/1988 | Iwasaki et al. |
| 4,812,539 A | 3/1989 | Iizuka et al. |
| 4,814,430 A | 3/1989 | Iwasaki et al. |
| 4,820,800 A | 4/1989 | Geibel et al. |
| 4,841,019 A | 6/1989 | Iwasaki et al. |
| 4,931,516 A | 6/1990 | Iizuka et al. |
| 4,976,825 A | 12/1990 | Iwasaki et al. |
| 5,015,725 A | 5/1991 | Scoggins et al. |
| 5,023,315 A | 6/1991 | Ceurvorst et al. |
| 5,037,954 A | 8/1991 | Nesheiwat et al. |
| 5,086,163 A | 2/1992 | Scoggins et al. |
| 5,110,902 A | 5/1992 | Scoggins et al. |
| 5,126,430 A | 6/1992 | Senga et al. |
| 5,179,194 A | 1/1993 | Kawakami et al. |
| 5,194,580 A | 3/1993 | Koyama et al. |
| 5,235,032 A | 8/1993 | Geibel et al. |
| 5,241,043 A | 8/1993 | Senga |
| 5,278,283 A | 1/1994 | Miyoshi et al. |
| 5,280,104 A | 1/1994 | Geibel et al. |
| 5,296,579 A | 3/1994 | Geibel et al. |
| 5,314,972 A | 5/1994 | Nesheiwat et al. |
| 5,342,920 A | 8/1994 | Imai et al. |
| 5,350,833 A | 9/1994 | Inoue et al. |
| 5,352,768 A | 10/1994 | Stuber et al. |
| 5,354,841 A | 10/1994 | Geibel et al. |
| 5,364,928 A | 11/1994 | Ash |
| 5,438,115 A | 8/1995 | Fahey et al. |
| 5,440,009 A | 8/1995 | Ash et al. |
| 5,635,587 A | 6/1997 | Koyama et al. |
| 5,688,908 A | 11/1997 | Haubs et al. |
| 5,744,576 A | 4/1998 | Miyahara et al. |
| 5,756,654 A | 5/1998 | Sase et al. |
| 5,777,069 A | 7/1998 | Tsuda et al. |
| 5,789,533 A | 8/1998 | Yamanaka et al. |
| 5,804,076 A | 9/1998 | Yamasaki et al. |
| 5,840,830 A | 11/1998 | Miyahara et al. |
| 5,856,433 A | 1/1999 | Koyama et al. |
| 5,898,061 A | 4/1999 | Sase et al. |
| 5,929,203 A | 7/1999 | Ash et al. |
| 6,001,934 A | 12/1999 | Yamanaka et al. |
| 6,201,097 B1 | 3/2001 | Geibel et al. |
| 6,242,501 B1 | 6/2001 | Green et al. |
| 6,281,326 B1 | 8/2001 | Ash et al. |
| 6,331,608 B1 | 12/2001 | Vidaurri et al. |
| 6,337,062 B1 | 1/2002 | Akiba |
| 6,562,900 B2 | 5/2003 | Okamoto et al. |
| 6,600,009 B2 | 7/2003 | Inoue et al. |
| 6,646,105 B2 | 11/2003 | Shirota |
| 6,653,437 B2 | 11/2003 | Hinokimori et al. |
| 6,743,890 B2 | 6/2004 | Bando |
| 6,750,319 B2 | 6/2004 | Koyama |
| 6,939,942 B2 | 9/2005 | Shirota |
| 6,982,312 B2 | 1/2006 | Senga et al. |
| 7,018,574 B2 | 3/2006 | Koyama |
| 7,026,439 B2 | 4/2006 | Senga et al. |
| 7,094,867 B2 | 8/2006 | Miyahara et al. |
| 7,115,704 B2 | 10/2006 | Horiuchi et al. |
| 7,220,817 B2 | 5/2007 | Matsuzaki et al. |
| 7,312,300 B2 | 12/2007 | Mitchell |
| 7,317,072 B2 | 1/2008 | Senga et al. |
| 7,432,339 B2 | 10/2008 | Mitchell |
| 7,504,476 B2 | 3/2009 | Kawama et al. |
| 7,517,946 B2 | 4/2009 | Sato et al. |
| 7,569,656 B2 | 8/2009 | Kagoshima et al. |
| 7,632,915 B2 | 12/2009 | Sato et al. |
| 7,655,748 B2 | 2/2010 | Sato et al. |
| 7,754,848 B2 | 7/2010 | Sato et al. |
| 7,767,783 B2 | 8/2010 | Kawama et al. |
| 7,834,133 B2 | 11/2010 | Suzuki et al. |
| 8,076,447 B2 | 12/2011 | Sato et al. |
| 8,138,302 B2 | 3/2012 | Sato et al. |
| 8,183,336 B2 | 5/2012 | Sato et al. |
| 8,211,997 B2 | 7/2012 | Matsuzaki et al. |
| 8,263,734 B2 | 9/2012 | Fodor et al. |
| 8,426,552 B2 | 4/2013 | Hinokimori et al. |
| 8,445,629 B2 | 5/2013 | Hinokimori et al. |
| 8,530,605 B2 | 9/2013 | Konno et al. |
| 8,546,518 B2 | 10/2013 | Unohara et al. |
| 8,680,230 B2 | 3/2014 | Konno et al. |
| 2003/0150804 A1* | 8/2003 | Haubs .................. B01D 12/00 210/634 |
| 2004/0249118 A1 | 12/2004 | Kagoshima et al. |
| 2005/0087215 A1* | 4/2005 | Miyahara .......... C08G 75/0281 134/32 |
| 2005/0171332 A1 | 8/2005 | Koyama |
| 2006/0084785 A1 | 4/2006 | Sato et al. |
| 2010/0137531 A1 | 6/2010 | Horiuchi |
| 2010/0163499 A1 | 7/2010 | Odueyungbo |
| 2010/0210813 A1 | 8/2010 | Foder et al. |
| 2010/0228003 A1 | 9/2010 | Hinokimori et al. |
| 2010/0234559 A1 | 9/2010 | Sato et al. |
| 2011/0124825 A1 | 5/2011 | Konno et al. |
| 2011/0178268 A1 | 7/2011 | Suzuki et al. |
| 2011/0319587 A1 | 12/2011 | Hinokimori |
| 2012/0165501 A1 | 6/2012 | Kaiho et al. |
| 2012/0322972 A1 | 12/2012 | Koizumi et al. |
| 2012/0329984 A1 | 12/2012 | Kim et al. |
| 2013/0022808 A1 | 1/2013 | Taniguchi et al. |
| 2013/0065054 A1 | 3/2013 | Ichinose et al. |
| 2013/0068256 A1 | 3/2013 | Kobayashi et al. |
| 2013/0116401 A1 | 5/2013 | Kimura et al. |
| 2013/0253147 A1 | 9/2013 | Ichinose et al. |
| 2014/0128568 A1 | 5/2014 | Hinokimori |
| 2015/0065664 A1 | 3/2015 | Konno et al. |

FOREIGN PATENT DOCUMENTS

| | | |
|---|---|---|
| JP | H07242746 | 9/1995 |
| JP | H07292107 | 11/1995 |
| JP | H07316428 | 12/1995 |
| JP | H07330911 | 12/1995 |
| JP | H0820644 | 1/1996 |
| JP | H0820645 | 1/1996 |
| JP | H08100064 | 4/1996 |
| JP | H08118502 | 5/1996 |
| JP | H08118503 | 5/1996 |
| JP | H08134216 | 5/1996 |
| JP | H08151443 | 6/1996 |
| JP | H08157600 | 6/1996 |
| JP | H08157718 | 6/1996 |
| JP | H08170016 | 7/1996 |
| JP | H08170017 | 7/1996 |
| JP | H08176302 | 7/1996 |
| JP | H08193130 | 7/1996 |
| JP | H08193131 | 7/1996 |
| JP | H08198965 | 8/1996 |
| JP | H08198966 | 8/1996 |
| JP | H08198967 | 8/1996 |
| JP | H08231722 | 9/1996 |
| JP | H08231723 | 9/1996 |
| JP | H08239474 | 9/1996 |
| JP | 2543673 | 10/1996 |
| JP | H08253587 | 10/1996 |
| JP | H08269199 | 10/1996 |
| JP | H08269200 | 10/1996 |

(56) References Cited

FOREIGN PATENT DOCUMENTS

| | | |
|---|---|---|
| JP | H08283413 | 10/1996 |
| JP | H08319348 | 12/1996 |
| JP | H0967439 | 3/1997 |
| JP | H09104816 | 4/1997 |
| JP | H09124940 | 5/1997 |
| JP | H09194726 | 7/1997 |
| JP | H09296042 | 11/1997 |
| JP | H107798 | 1/1998 |
| JP | H1045911 | 2/1998 |
| JP | H1045912 | 2/1998 |
| JP | H1060113 | 3/1998 |
| JP | H10110034 | 4/1998 |
| JP | H10158399 | 6/1998 |
| JP | H10195197 | 7/1998 |
| JP | H10245434 | 9/1998 |
| JP | H1180355 | 3/1999 |
| JP | H11169870 | 6/1999 |
| JP | H11349566 | 12/1999 |
| JP | 2000136246 | 5/2000 |
| JP | 2000239383 | 9/2000 |
| JP | 2001040090 | 2/2001 |
| JP | 2001172387 | 6/2001 |
| JP | 2001181394 | 7/2001 |
| JP | 2002187949 | 7/2002 |
| JP | 2002201274 | 7/2002 |
| JP | 2002201275 | 7/2002 |
| JP | 2002212292 | 7/2002 |
| JP | 2003026803 | 1/2003 |
| JP | 2003275773 | 9/2003 |
| JP | 2004107567 | 4/2004 |
| JP | 2004182753 | 7/2004 |
| JP | 2004352923 | 12/2004 |
| JP | 2005041922 | 2/2005 |
| JP | 2005047953 | 2/2005 |
| JP | 2005264030 | 9/2005 |
| JP | 2005344045 | 12/2005 |
| JP | 2006016567 | 1/2006 |
| JP | 2007077209 | 3/2007 |
| JP | 2008075055 | 4/2008 |
| JP | 2008239767 | 10/2008 |
| JP | 2008248153 | 10/2008 |
| JP | 2008248154 | 10/2008 |
| JP | 4256506 | 4/2009 |
| JP | 2009185143 | 8/2009 |
| JP | 2010037518 | 2/2010 |
| JP | 2010126621 | 6/2010 |
| JP | 4994997 | 8/2012 |
| JP | 2013023586 | 2/2013 |
| WO | WO 2013/061561 A1 | 5/2013 |
| WO | WO 2013/147141 | 10/2013 |

OTHER PUBLICATIONS

International Patent Application No. PCT/US2014/54741; International Search Report and Written Opinion dated Nov. 25, 2014; (7 pages).
International Patent Application No. PCT/US2014/54724; International Search Report and Written Opinion dated Dec. 8, 2015; (6 pages).
International Patent Application No. PCT/US2014/54728; International Search Report and Written Opinion dated Jan. 16, 2015; (11 pages).
International Patent Application No. PCT/US2014/54745; International Search Report and Written Opinion dated Nov. 25, 2014; (7 pages).
International Patent Application No. PCT/US2014/54750; International Search Report and Written Opinion dated Jan. 22, 2014; (11 pages).

\* cited by examiner

METHOD AND SYSTEM FOR SEPARATION OF A POLYMER FROM MULTIPLE COMPOUNDS

CROSS REFERENCE TO RELATED APPLICATIONS

The present application claims filing benefit of U.S. Provisional Patent application 61/882,325 having a filing date of Sep. 25, 2013, which is incorporated herein by reference in its entirety.

BACKGROUND OF THE INVENTION

Polymer formation processes generally include a washing/purification step during which the product polymer is separated from solvents, byproducts, processing aids, etc. that are utilized or formed during the polymerization reaction. This separation process can be particularly difficult when considering high-performance polymers that are formed in high boiling temperature solvents, as the product polymer should be separated virtually completely (e.g. greater than 99% purification) from compounds that can include salts, acids, bases, etc. Separation of the product polymer from such compounds can pose waste treatment problems, particularly when the separation process includes formation of large quantities of dilute washing liquor.

High performance polymers that can present such waste treatment problems in purification of the product polymer can include, without limitation, polyaramides polymerized from diamines and diacid chlorides; polycarbonates polymerized from diphenols or diphenozides and phosgene; polysulfones, polyether sulfones, and polyether ketones polymerized from diphenoxides and dihalogenated aromatic hydrocarbons; and polyaryienesiloxanes polymerized from diaryldichiorosilanes and diphenoxides.

Polyarylene sulfides are high-performance polymers that present such purification problems. Polyarylene sulfides are generally formed via polymerization of a dihaloaromatic compound with an alkali metal sulfide or an alkali metal hydrosulfide in a high boiling point organic amide solvent. Following formation, the polyarylene sulfide must be separated from the solvent as well as from byproducts of the formation process and from processing aids, which may include both dissolved and undissolved compounds. For instance, the proportion of residual solvent in the formed polymer should be less than 100 parts per million (ppm). Unfortunately, traditional separation processes that adequately remove the extraneous compounds can generate large volumes of dilute washing liquid, which in turn requires treatment for materials recovery thus increasing both economic and environmental costs of the production process.

Standard methods for separation of a polymer from other compounds have included utilizing heat and reduced pressure to vaporize volatile compounds. Unfortunately, this process is time-consuming as well as costly and nonvolatile compounds may remain with the polymer. Another method that has been utilized is extraction of the polymer slurry with a low boiling point solvent such as acetone. This also introduces added costs as the solvent must be recovered, for instance through an additional distillation process. The more straight forward and simple methods such as repeated washings with solvents are also problematic as they generate a great deal of waste that must in turn be treated.

What are needed in the art are methods, devices, and systems that can be utilized for separation of a product polymer from compounds of formation of the polymer. Devices, methods, and systems that can keep capital costs low and avoid the formation of additional waste would be of benefit.

SUMMARY OF THE INVENTION

According to one embodiment, a method is disclosed for separating a solid polymer from multiple compounds of formation of the polymer. The method includes introducing a first slurry into a first sedimentor. The first slurry includes the solid polymer, a liquid carrier, and multiple compounds of formation of the polymer. The method also includes introducing a first solvent into the first sedimentor such that the first slurry flows countercurrent to the first solvent within at least a portion of the first sedimentor. One or more compounds of formation of the polymer are soluble in the first solvent, and these one or more compounds can transfer from the first slurry to the first solvent within the first sedimentor. Thus, the first slurry can be transformed to form a second slurry.

The method also includes introducing the second slurry into a second sedimentor and introducing a second solvent into the second sedimentor. The first and second solvents are different. For example, one of the first and second solvents can be an organic solvent and the other can be an aqueous solvent. The second slurry can flow through the second sedimentor countercurrent to the second solvent within at least a portion of the second sedimentor. One or more compounds of formation of the polymer are soluble in the second solvent, and these one or more compounds can transfer from the second slurry to the second solvent within the second sedimentor. Thus, the second slurry can be transformed to form a third slurry.

Also disclosed is a sedimentor that can be utilized in carrying out the method. The sedimentor includes three sections: an upper section that includes an outlet for a liquid flow out of the sedimentor, a middle section that includes an inlet for a slurry flow into the sedimentor, and a bottom section including an inlet for a liquid flow into the sedimentor and an outlet for a slurry flow out of the sedimentor. In addition, the sedimentor is designed such that the inlet for the slurry flow joins a wall of the middle section such that the inlet for the slurry flow is substantially tangent to the wall of the middle section.

Also disclosed is a system that can be utilized for carrying out the method. The system can include a first sedimentor that in turn includes a slurry inlet, a liquid inlet for delivering a first solvent to the first sedimentor, and a slurry outlet from the first sedimentor. The liquid inlet can be located on the first sedimentor such that a slurry flowing through the first sedimentor flows countercurrent to the first solvent delivered via the liquid inlet within at least a portion of the first sedimentor.

The system can also include a second sedimentor. The second sedimentor can include a slurry inlet to the second sedimentor. More specifically, the slurry outlet from the first sedimentor can be in fluid communication with the slurry inlet to the second sedimentor. The second sedimentor also includes a liquid inlet to the second sedimentor for delivering a second solvent to the second sedimentor. The liquid inlets are designed such that the first solvent and the second solvent are different solvents. In addition, the liquid inlet can be located on the second sedimentor such that a slurry flowing through the second sedimentor flows countercurrent to the second solvent delivered via the liquid inlet within at least a portion of the second sedimentor. The second sedimentor can also include a slurry outlet.

BRIEF DESCRIPTION OF THE FIGURES

The present disclosure may be better understood with reference to the following figures.

DETAILED DESCRIPTION

It is to be understood by one of ordinary skill in the art that the present discussion is a description of exemplary embodiments only, and is not intended as limiting the broader aspects of the present invention.

The present disclosure is generally directed to methods that can be utilized in separating a polymer from compounds of formation of the polymer. Systems and devices as may be utilized in carrying out the methods are also described. More specifically, disclosed methods utilize multiple sedimentors in a countercurrent flow design in conjunction with different solvent solutions in the multiple sedimentors to separate a product polymer from other compounds of formation of a polymer formation process. For instance, a slurry to be treated by the method can include the product polymer in conjunction with compounds of formation of the polymer that can include, without limitation, a liquid carrier that can be, e.g., an organic or aqueous solvent, byproducts of the polymerization reaction, processing aids utilized to enhance the polymerization reaction (e.g., catalysts, co-solvents, etc.), unreacted monomers of the formation process, and so forth.

By utilization of multiple different solvents in multiple sedimentors a high purity polymer product can be obtained and essentially all of the polymer of the initial input slurry can be separated as recovered product. For instance about 95% or more, or about 98% or more, of the polymer in the initial input slurry can be recovered as purified product. The multiple solvents can be selected such that each targeted compound of the initial slurry is soluble in or otherwise removable by at least one of the solvents. Moreover, the system can be easily modified to account for variations in the feed slurry by merely adjusting the collection of solvents to target the variation in the individual compounds of the slurry. For instance, the solvent of a single sedimentor can be altered without alteration of other aspects of the system and thus this alteration can cause little interruption and less down time of the entire system.

The countercurrent flow of the slurry and the solvent within each sedimentor of a system can enhance the mass transfer rate between the two as compared to other systems such a concurrent flow systems or simple batch wash systems. This can further improve the separation method as the enhanced mass transfer rate can reduce the amount of solvent necessary to obtain an equivalent efficiency in removal of targeted compounds of formation from the slurry that contains the polymer. This in turn can improve production rate of the polymer as well as decrease operational costs and waste generation.

In one embodiment, the system can include recovery and recycle of the solvents used in the sedimentors. This can further improve the efficiency of the system. By recycling at least a portion of the solvent from a sedimentor back to an upstream sedimentor, the amount of solvent used in the process can be dramatically decreased, which can cut costs and improve the economic benefits of the methods and systems.

Figures 1, 2:
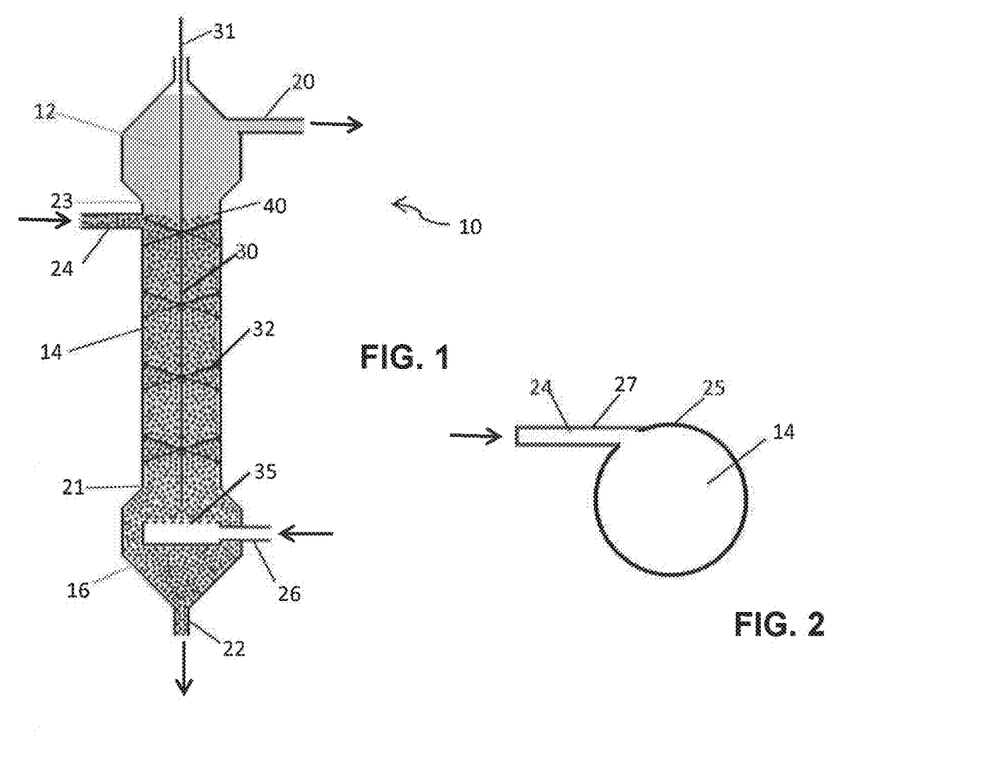
FIG. 1 illustrates one embodiment of a sedimentor as described herein.
FIG. 2 illustrates a cross-sectional top view of the middle section of the sedimentor of FIG. 1 at the slurry inlet.

Referring to FIG. 1, one embodiment of a sedimentor 10 is illustrated. The sedimentor 10 can include an upper section 12 that includes liquid outlet 20, a middle section 14 that includes slurry inlet 24, and a lower section 16 that includes solids outlet 22 and liquid inlet 26. Though illustrated with a vertical arrangement, it should be understood that the sedimentor can be utilized at other than a vertical arrangement, and the sedimentor can be at an angle to vertical as long as solids flow through the sedimentor from the slurry inlet 24 to the outlet 22 can be by gravitational force.

The upper section 12 and the lower section 16 can have cross sectional areas that are larger than that of the middle section 14. In one embodiment, the sections of the sedimentor 10 can be circular in cross section, in which case the upper section 12 and lower section 16 can have cross sectional diameters that are larger than the cross sectional diameter of the middle section 14. For instance, the upper section 12 and the lower section 16 can have diameters that are from about 1.4 to about 3 times greater than the diameter of the middle section. For instance, the upper and lower sections 12, 26 can independently have diameters that are about 1.4, about 2, or about 2.5 times greater than the diameter of the middle section 14. The larger cross sectional area of the upper section 12 can prevent overflow of solids at the outlet 20 and the larger cross sectional area of the lower section 16 can prevent solids flow restriction at the outlet 22.

The sedimentor 10 is not limited to any particular geometric shape and the cross section of the sedimentor is not limited to circular. Moreover, the cross sectional shape of each section of the sedimentor can vary with regard to one another. For example, one or two of the upper section 12, the middle section 14, and the lower section 16 can have an oval-shaped cross section, while the other section(s) can be round in cross section.

The middle section 14 of the sedimentor 10 can include slurry inlet 24 through which a slurry including a solid product polymer can be fed to the sedimentor 10. As shown in FIG. 2, the slurry inlet 24 meets the wall 25 of the middle section 14 substantially tangent to the wall 25. The term "substantially tangent" as utilized herein can be determined by the distance between the true tangent of the wall 25 of the middle section 14 and the outer wall 27 of the inlet 24. When the inlet 24 meets the wall 25 of the middle section at a perfect tangent, this distance will be 0. In general, this distance will be less than about 5 centimeters, for instance less than about 3 centimeters.

Placement of the slurry inlet 24 such that the inlet 24 is substantially tangent to the outer wall 25 of the middle section 14 can prevent disruption of the fluid flow pattern within the sedimentor 10. This can improve contact and mass transfer between the downward flowing solids and the upward flowing liquid and can also prevent loss of solids through the outlet 20 of the upper section 12.

To further ensure that solids are not lost through the outlet 20, the inlet 24 can be placed in the middle section 14 at a distance from the junction 23 where the middle section 14 meets the upper section 12. For instance, the vertical distance between the midpoint of the inlet 24 and the junction 23 can be equal to or greater than about 5% of the total height of the middle section 14. For instance, the vertical distance between the midpoint of the inlet 24 and the junction 23 can be from about 5% to about 50% of the total height of the middle section 14. The total height of the middle section 14 is that distance between the junction 23, where the upper section 12 meets the middle section 14 and the junction 21, where the middle section 14 meets the lower section 16.

The slurry can include a product polymer in conjunction with compounds of formation, which can include compounds utilized during polymerization of the product polymer and compounds formed during polymerization of the product polymer. The product polymer that can be separated from other compounds of a slurry by use of the sedimentors is not particularly limited, and can include any polymer that can sediment under the force of gravity within the sedimentor. The solids content of the feed slurry is also not particularly limited. The upper limit of the solids content will be determined by the viscosity of the slurry that determines the flowability of the slurry, and the system can separate a slurry having a small content of solids as well, as long as the slurry can flow through the sedimentor and the solids can sediment under the force of gravity. Accordingly, the density of the solids of the slurry will be greater than that of the liquid carrier of the slurry. For instance, the sedimentation velocity of the solids in the liquid carrier of the slurry can be greater than about 1 centimeter per minute. In general, the average particle size of the solids in the slurry can be greater than about 50 micrometers, and larger particle sizes can lead to a faster separation process, as is known.

In one embodiment, the polymer to be separated from the slurry can be a high performance polymer. For instance, the product polymer can be a polyaramide, a polycarbonate, a polysulfone, a polyether sulfone, a polyether ketone, a polyarylenesiloxane, and so forth.

According to one embodiment, the system and device and be utilized to separate a polyarylene sulfide from other compounds utilized in or formed during the polymerization process. In general, the polyarylene sulfide can be a polyarylene thioether containing repeat units of the following formula:

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from —$SO_2$—, —S—, —SO—, —CO—, —O—, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide can typically include more than about 30 mol %, more than about 50 mol %, or more than about 70 mol % arylene sulfide (—AR—S—) units. In one embodiment the polyarylene sulfide includes at least 85 mol % sulfide linkages attached directly to two aromatic rings. The radical Ar may be a phenylene or naphthylene radical. In one embodiment, the second segment may be derived from poly(m-thiophenylene), from poly(o-thiophenylene), or from polyp-thiophenylene). In one embodiment, the polyarylene sulfide purified by the process can be a polyphenylene sulfide, defined herein as containing the phenylene sulfide structure —$(C_6H_4—S)_n$— (wherein n is an integer of 1 or more) as a component thereof. The polyarylene sulfide may be a homopolymer or may be a copolymer and may be linear, semi-linear, branched or crosslinked.

The slurry fed to the sedimentor 10 via the inlet 24 can include the solid polymer in conjunction with a solvent used in forming the polymer. Exemplary organic amide solvents used in a forming a polyarylene sulfide can include, without limitation, N-methyl-2-pyrrolidone (NMP); N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof.

The slurry can also include byproducts of the polymerization reaction, such as salts that are formed during the polymerization reaction as well as compounds that are of benefit to the polymerization reaction such as salts that can be utilized as promoters of the polymerization reaction, reaction catalysts, and so forth.

The line at inlet 24 can carry the slurry from a polymerization reaction apparatus to the middle section 14 of the sedimentor 10. The polymerization reaction apparatus is not especially limited. Examples of typical reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. Further examples of such a reaction apparatus include a mixing apparatus commonly used in kneading, such as a kneader, a roll mill, a Banbury mixer, etc.

The middle section 14 of the sedimentor can include an agitator 30 that incorporates an axial shaft 31 and a series of stirring blades 32 along the axial length of the middle section 14. The agitator 30 can prevent channeling of liquid within the sediment (fluidized bed) and can maintain contact between the slurry contents and the upwardly flowing solvent as well as maintain flow of the solids through the sedimentor 10. The stirring blades 32 can extend from the axial shaft 31 toward the wall 25 of the middle section 14. In general, the stirring blades can extend at least half of the distance from the axial shaft to the wall 25 and, in one embodiment, can extend almost all of the way to the wall 25. In one embodiment, the sedimentor can be free of sedimentation plates or trays as have been utilized in previously known sedimentors.

As shown, the axial shaft 31 can support a series of stirring blades 32 along the length of the middle section 14. In general, at least two stirring blades 32 can extend from the axial shaft 31 in a balanced arrangement at each point of blade extension. This is not a requirement, however, and three, four, or more stirring blades can extend from the axial shaft 31 at a single location along the shaft 31 or alternatively, a single blade can extend from a single location on the shaft 31 and the stirring blades can be offset from one another as they pass down the length of the shaft 31 so as to maintain balance of the agitator 30 during use. The axial shaft 31 can have stirring blades 32 extending therefrom at a plurality of locations along the shaft 31. For instance, the axial shaft can have stirring blades extending therefrom at from about 3 to about 50 locations along axial shaft 31, with two or more stirring blades 32 extending from the axial shaft at each location. In one embodiment, the distribution of the blades along the axial shaft 31 can be such that there are more blades in the fluidized bed section at the bottom as compared to the number of blades in the upper portion of section 14.

During operation, the axial shaft 31 can rotate at a speed that is typically from about 0.1 rpm to about 1000 rpm, for instance from about 0.5 rpm to about 200 rpm or from about 1 rpm to about 50 rpm.

As the slurry is fed to the middle section 14 of the sedimentor 10 via the slurry inlet 24, and the countercurrent flow passes up the sedimentor, the solids can form a fluidized bed in the sedimentor with increasing concentration of solids from the top of the bed to the solids outlet 22. According to one embodiment, the fluidized bed height can be monitored and controlled so as to better control the residence time of solids in the sedimentor. Through improved control of residence time for the sedimentor, the efficiency of the separation process carried out within the sedimentor can be improved, which can translate to lower operational costs and improved separations. In addition, control of the fluidized bed height and residence time can help to prevent solids loss through the liquid outlet 20 of the upper section 12.

A sensor can be used to monitor the fluidized bed height within the sedimentor 10. The sensor type is not limited and can be any suitable sensor that can monitor the fluidized bed height including both internal sensors and external sensors. For example, sensors can utilize, without limitation, optical, infrared, radio frequency, displacement, radar, bubble, vibrational, acoustic, thermal, pressure, nuclear and/or magnetic detection mechanisms to determine the fluidized bed height within the sedimentor 10. By way of example, in one embodiment an optical sensor 40, e.g., a laser-based sensor including a laser source and a detector, can be located within the middle section 14 of the sedimentor 10, for instance near the level of the slurry inlet 24, which can detect reflection of the laser to determine relative density differences of the materials within the sedimentor 10 and thus convey information concerning the location of the top of the fluidized bed to a control system. The control system can relay that information to a valve that can control flow of solids out of the sedimentor at outlet 22 and/or a valve that can control flow of solids into the sedimentor at inlet 24 so as to control the bed height. Surge tanks may also be included in the lines leading to and from the sedimentor as is known to maintain control of the fluidized bed height. Other systems as are known in the art for controlling the height of a fluidized bed may alternatively be utilized, and the method and system utilized to control the bed height is not particularly limited.

In general, the top of the fluidized bed can be at or near the slurry inlet 24. To improve control of the residence time of the solids in the sedimentor 10, the sediment bed height variation during the process can vary less than about 10% of the total height of the middle section 14. For instance, the fluidized bed height variation during a process can be less than about 5% of the total height of the middle section 14.

Figure 3:
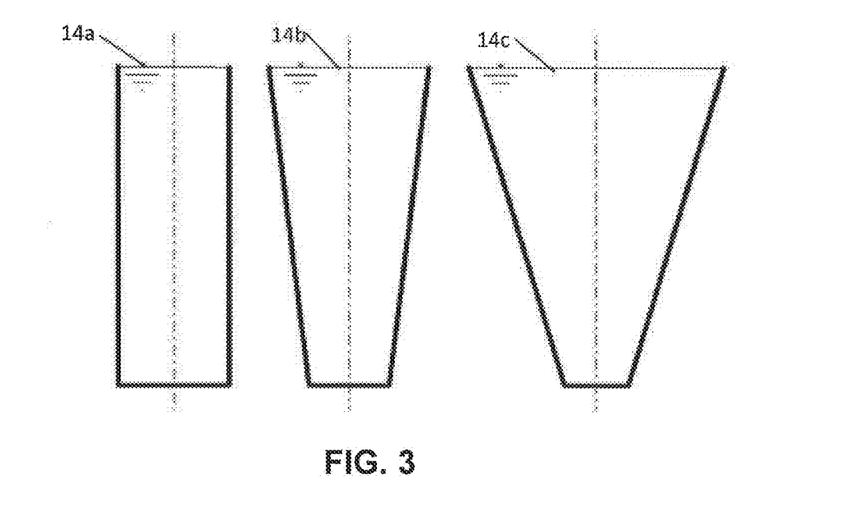
FIG. 3 illustrates several different embodiments of longitudinal cross-sectional shapes of a middle section of a sedimentor.

Though illustrated in FIG. 1 as a cylindrical column, the longitudinal cross-sectional shape of the middle section 14 is not limited to this embodiment. For example, and as illustrated in FIG. 3, middle sections 14a, 14b, 14c of sedimentors can be straight or tapered with increasing angles from a cylindrical middle section as illustrated at 14a to increasing angles as shown at 14b and 14c. When tapered, the middle section can be wider at the top than at the bottom so as to increase solids concentration at the bottom of the sedimentor without impeding transport of solids. That is, if the angle of taper is too large, solids flow may be impeded at the wall of the middle section. A preferred taper angle will vary for each system depending upon flow rates, physical properties of the compounds to be carried within the system such as particle size and shape, as well as depending on column materials and surface roughness.

The lower section 16 of the sedimentor 10 can include a liquid inlet 26 through which the desired solvent can flow. Generally, the liquid inlet can include a distributor 35 that can enhance fluid flow through the solids and prevent channeling of the fluid flow as well as prevent any solids from entering the inlet 26. The lower section 16 can have a conical shape as shown that can concentrate the solids content at the outlet 22. The solids content of the slurry at the outlet 22 can generally be about 20 wt. % or greater, or about 22 wt. % or greater in some embodiments.

The liquid media fed to the sedimentor via inlet 26 can function as a solvent for one or more compounds of the slurry that is fed to the sedimentor via inlet 24. The solvent may be aqueous or organic, or may include a miscible mixture of aqueous and organic components. For instance, an aqueous solvent may be water, acetone or an aqueous solution thereof, a dissolved salt solution, and/or an acidic media such as acetic acid or hydrochloric acid or an aqueous solution thereof.

An aqueous solvent can be heated. For instance, an aqueous solvent fed to the sedimentor 10 at inlet 26 can be at or above about 100° C., for instance higher than about 120° C., higher than about 150° C., or higher than about 170° C., provided that the solvent will not affect the solid product polymer of the slurry. Generally, distilled water or deionized water can be used in forming an aqueous solvent. For solvents operating above the boiling point, provisions should be made for operating the sedimentor under pressure to prevent vaporization of solvent.

Organic solvents that will not decompose the product polymer can be used as a counter current solvent flow. Organic solvents can include, without limitation, nitrogen-containing polar solvents such as N-methyl-2-pyrrolidone, dimethylformamide, dimethylacetamide, 1,3-dimethylimidazolidinone, hexamethylphosporamide, and piperazinone; sulfoxide and sulfone solvents such as dimethyl sulfoxide, dimethylsulfone, and sulfolane; ketone solvents such as acetone, methyl ethyl ketone, diethyl ketone, and acetophenone, ether solvents such as diethyl ether, dipropyl ether, dioxane, and tetrahydrofuran; halogen-containing hydrocarbon solvents such as chloroform, methylene chloride, ethylene dichloride, trichloroethylene, perchloroethylene, monochloroethane, dichloroethane, tetrachloroethane, perchioroethane, and chlorobenzene; alcohol and phenol solvents such as methanol, ethanol, propanol, butanol, pentanol, ethylene glycol, propylene glycol, phenol, cresol, polyethylene glycol, and polypropylene glycol; and aromatic hydrocarbon solvents such as benzene, toluene, and xylene. Further, solvents can be used alone or as a mixture of two or more thereof. Moreover, a mixture can include a miscible mixture of aqueous and organic solvents.

The temperature for a solvent can be supplied at a temperature of from about 20° C. to about 300° C. Separation efficiency can be increased with an elevation of the temperature within the sedimentor, but in general, a satisfactory effect is obtained at a temperature of from about 20° C. to about 150° C. Accordingly, in one embodiment, the sedimentor can include heating elements to maintain an elevated temperature within the sedimentor during a separation process.

In one embodiment, one of the solvents (or an additional solvent in an additional sedimentor) can be utilized to separate the product polymer from the liquid carrier of the feed slurry. For example, when considering the purification of a polyarylene sulfide polymer, the feed slurry can include the product polymer and a high boiling temperature organic amide solvent. In this embodiment, the organic solvent can be separated from the product polymer by use of a sedimentor in which an aqueous solvent is provided to the liquid inlet in the lower section of the sedimentor. During the separation process within the sedimentor, the product polymer can be preferentially carried by the aqueous solvent. Thus, the product polymer can transfer from the organic solvent carrier to the aqueous solvent within the middle section 14 of the sedimentor 10. With this transfer, the aqueous solvent can become the new liquid carrier for the solid polymer. At the outlet 22 the product polymer can be discharged while carried in the aqueous solvent and the organic amide solvent can be discharged at the liquid outlet 20.

Transfer of the solid product polymer from a first liquid carrier to a second liquid carrier within one of the sedimentors of the process is not limited to those embodiments in which the first liquid carrier is organic and the second liquid carrier is aqueous. The solid product polymer can be transferred to any second liquid carrier that can provide a desired characteristic to the final slurry. For instance, a slurry that includes an organic liquid carrier can be processed so as to transfer the solid product polymer to a second, different organic liquid carrier; a slurry that includes an aqueous carrier can be processed to transfer the solid product polymer to an organic liquid carrier or a different aqueous liquid carrier, etc. The second liquid carrier can be desirable for, e.g., downstream treatment purposes (e.g., ease of drying the product polymer or improvements in melt processing the product polymer) or due to the final application of the product polymer.

A system as disclosed herein can include multiple sedimentors in series with different solvents utilized in the multiple sedimentors. For instance, a first sedimentor can utilize an organic solvent to remove solids from the slurry that are soluble in the organic solvent, a second sedimentor can utilize an aqueous solvent to remove solids that are soluble in the aqueous solvent and to transfer the polymer from the organic liquid carrier to the aqueous liquid carrier, and a third (and optionally additional) sedimentors can utilize the same or different aqueous solvents to remove solids from the slurry that are soluble in the aqueous solvents as well as to remove any remaining organic solvents from the slurry.

To improve the efficiency and economic benefits of the system, the solvent ratio of each sedimentor can be controlled. As utilized herein, the term "solvent ratio" generally refers to the ratio of the amount of solvent by weight fed to each sedimentor to the weight of polymer fed to the separation process. A lower solvent ratio can translate to lower costs for the process due to the lower amount of solvent utilized. However, the solvent ratio should be large enough to provide for adequate separation of contaminants and flow of the slurries. The optimal solvent ratio for any sedimentor can vary, generally depending upon the separations occurring within that specific sedimentor. For instance, when considering a sedimentor within which the product polymer can transfer from one liquid carrier to a different liquid carrier (e.g., the polymer transfers from an organic carrier to an aqueous carrier), the solvent ratio can be from about 1.5 to about 3, or from about 2 to 2.5. When considering a sedimentor within which contaminants that are soluble in the solvent are removed, and the liquid carrier of the product polymer remains essentially the same for the inlet slurry and the outlet slurry (e.g., remains as an organic carrier or an aqueous carrier), the solvent ratio can be from about 3 to about 4.5, or from about 3.5 to about 4.

Figure 4:
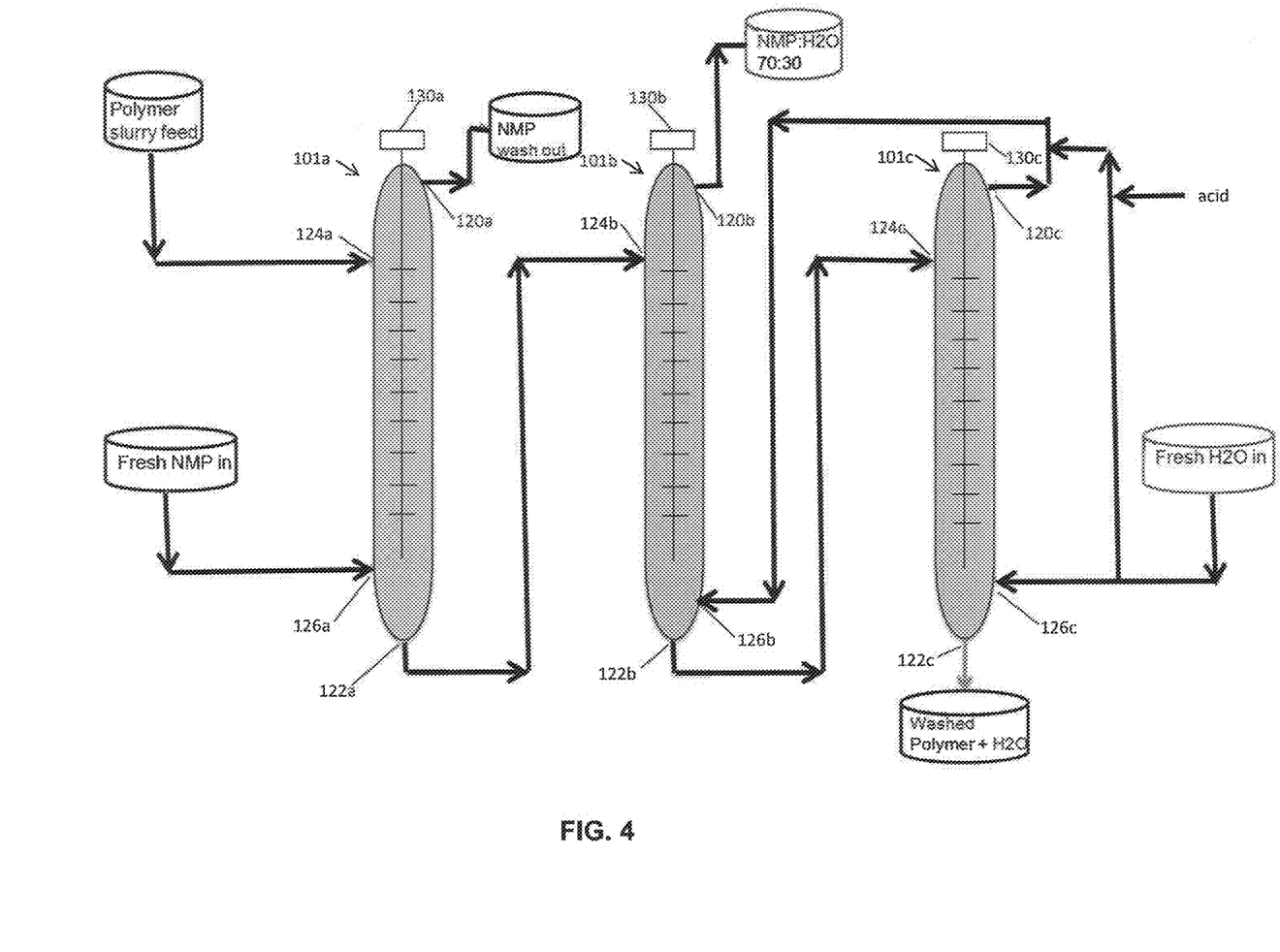
FIG. 4 illustrates one embodiment of a sedimentation system and method including three sedimentors utilizing different counter current solvent flow in each sedimentor.

FIG. 4 illustrates one embodiment in which three sedimentors 101a, 101b, 101c are utilized in series. While the system can include one or more sedimentors having the design as described above, this is not a requirement of the disclosed systems. For instance, and as illustrated in FIG. 4, a system can include sedimentors that vary somewhat in design from the sedimentor described above, e.g., the sedimentors of the system of FIG. 4 do not include upper and lower sections having a larger cross sectional area as compared to the middle section. In any case, a system can include multiple sedimentors in series and each sedimentor can be utilized with a different solvent and with countercurrent solvent flow to the slurry feed.

To initiate flow through a sedimentor 101a, a general process can include filling the sedimentor 101a with slurry flow via inlet 124a until the solids bed height meets the desired level. In general this will be carried out while the bed is stirred via agitator 130a. Once the bed height has been reached, the counter current solvent flow can begin via inlet 126a. When the liquid flow off of the top of the bed begins at outlet 120a, the sedimentor can be fully operational and control operations such as bed height control can be carried out. As shown in FIG. 4, the solids outlet 122a can feed the solids from the first sedimentor 101a to the slurry inlet 124b of the second sedimentor 101b.

An exemplary system will now be described for the separation of a solid polyarylene sulfide product polymer from other components of a polymerization reaction slurry. It should be understood that the system is not in any way limited to these specific materials however and other polymers, solvents, and components can be utilized in a system.

With reference to FIG. 4, a polymer slurry feed can be provided to the sedimentor 101a via slurry feed inlet 124a. The polymer slurry feed can include the solid polyarylene sulfide product polymer, an organic amide solvent, byproducts of the polymerization reaction such as salts, etc., and any other compounds of formation that are formed by or utilized in the polymerization reaction such as catalysts, co-solvents, unreacted monomers, etc.

An organic solvent such as N-methyl-2-pyrrolidone (NMP) can be fed to the sedimentor 101a via liquid inlet 126a in the lower section of the sedimentor 101a. The liquid outlet 120a at the upper section of the sedimentor 101a can carry the NMP wash product, which can include the NMP solvent and dissolved compounds of the polymer slurry feed. For example, unreacted dihaloaromatic monomer (e.g., p-dichlorobenzene) can be dissolved and removed from the product polymer by use of the countercurrent NMP flow.

The solids flow from the outlet 122a of the first sedimentor 101a can include the solid polymer product and the organic amide solvent as a carrier. This slurry can then be utilized as the feed slurry for the second sedimentor 101b, and can be fed to the middle section of the second sedimentor 101b at slurry feed inlet 124b.

The solvent utilized in the second sedimentor 101b can be an aqueous solvent that includes water and an acid, for instance water and acetic acid. The solvent can be fed into the second sedimentor at inlet 126b. The countercurrent flow between the slurry and the solvent can transfer the solid product polyarylene sulfide from the organic solvent of the feed slurry to the aqueous solvent. Thus, the liquid pulled off of the sedimentor 101*b* at the liquid outlet 120*b* can include a large portion of organic solvent (NMP) with (optionally) an amount of the aqueous solvent. The outlet 122*b* can carry the solids in a liquid carrier that is now primarily water, though some additional compounds may remain in the slurry of the outlet flow. The aqueous solvent of the second sedimentor 101*b* can also dissolve compounds such as salt byproducts from the product polymer and these compounds can be removed from the product polymer via the countercurrent flow. Thus the liquid removed from the sedimentor 101*b* at liquid outlet 120*b* can also include one or more dissolved compounds from the slurry.

In the final sedimentor 101*c*, the slurry feed from the second sedimentor can be fed via feed slurry inlet 124*c*. In this final separation step, the liquid solvent fed to the lower section of the sedimentor 101*c* via the liquid inlet 126*c* can be pure water. The counter current flow of the water can remove any remaining organic solvent and any remaining water-soluble contaminants from the feed slurry of the third sedimentor 101*c*. As can be seen, the liquid that is pulled off of the top of this third sedimentor 101*c* at liquid outlet 120*c* can be utilized to form the solvent of the second sedimentor 101*b*. The liquid pulled off of the top of the third sedimentor 101*c* will include water and a relatively small amount of contaminants that are removed from the solid polyarylene sulfide within the third sedimentor 101*c*. Thus, upon combination with the desired acid, as shown, this liquid stream can be utilized at the second sedimentor. Such reuse of the washing liquids of the system can provide significant costs savings to a system.

The product pulled off of the bottom of the third sedimentor can include the product polyarylene sulfide polymer and water, with insignificant amounts of other materials, such as the organic solvent of the original feed slurry.

In one embodiment, the system can include one or more recycle streams that can recover solvent and can recycle solvent from one sedimentor to an upstream sedimentor. For example, in one embodiment, the first sedimentor can utilize as the input solvent an organic liquid that is the same as the liquid carrier of the slurry that is fed to the sedimentor. The increased concentration of the organic solvent can dissolve and remove certain solids from the initial slurry feed. In a downstream sedimentor, an aqueous solvent can be utilized, and the polymer can transfer from the original organic carrier to the aqueous liquid. In this embodiment, the liquid outlet at the top of the downstream sedimentor can carry a liquid that includes a high concentration of the organic solvent. At least a portion of this outlet stream can then be recovered recycled back to the first sedimentor and fed to the sedimentor in conjunction with an amount of fresh make-up organic solvent at the liquid inlet.

Of course, a recovery and recycle process between sedimentors does not require the transfer of the polymer to a different liquid carrier in either one of the sedimentors. Recovery and recycle of the liquid removed at a liquid outlet can be utilized for any upstream sedimentor that feeds a similar solvent (e.g., both organic or both aqueous solvents) to the upstream sedimentor. By way of example, a first sedimentor can utilize an aqueous solvent (e.g., water combined with an acid) that can remove contaminants from the slurry. A second, downstream sedimentor can utilize an aqueous solvent that can be different or the same as the aqueous solvent of the upstream sedimentor (e.g., pure water) and can remove the same or different contaminants from the slurry. All or a portion of the aqueous solvent that comes off of the downstream sedimentor can then be recovered and recycled back to the upstream sedimentor.

The proportion of the solvent fed to an upstream sedimentor that can be recovered and recycled from a downstream sedimentor can vary depending upon the type of solvent as well as the desired solvent ratio of each sedimentor. In general, from about 50% to about 90%, or from about 60% to about 85% of the solvent fed to the bottom of a sedimentor at the liquid input can be recycled solvent from a downstream sedimentor.

Figure 5:
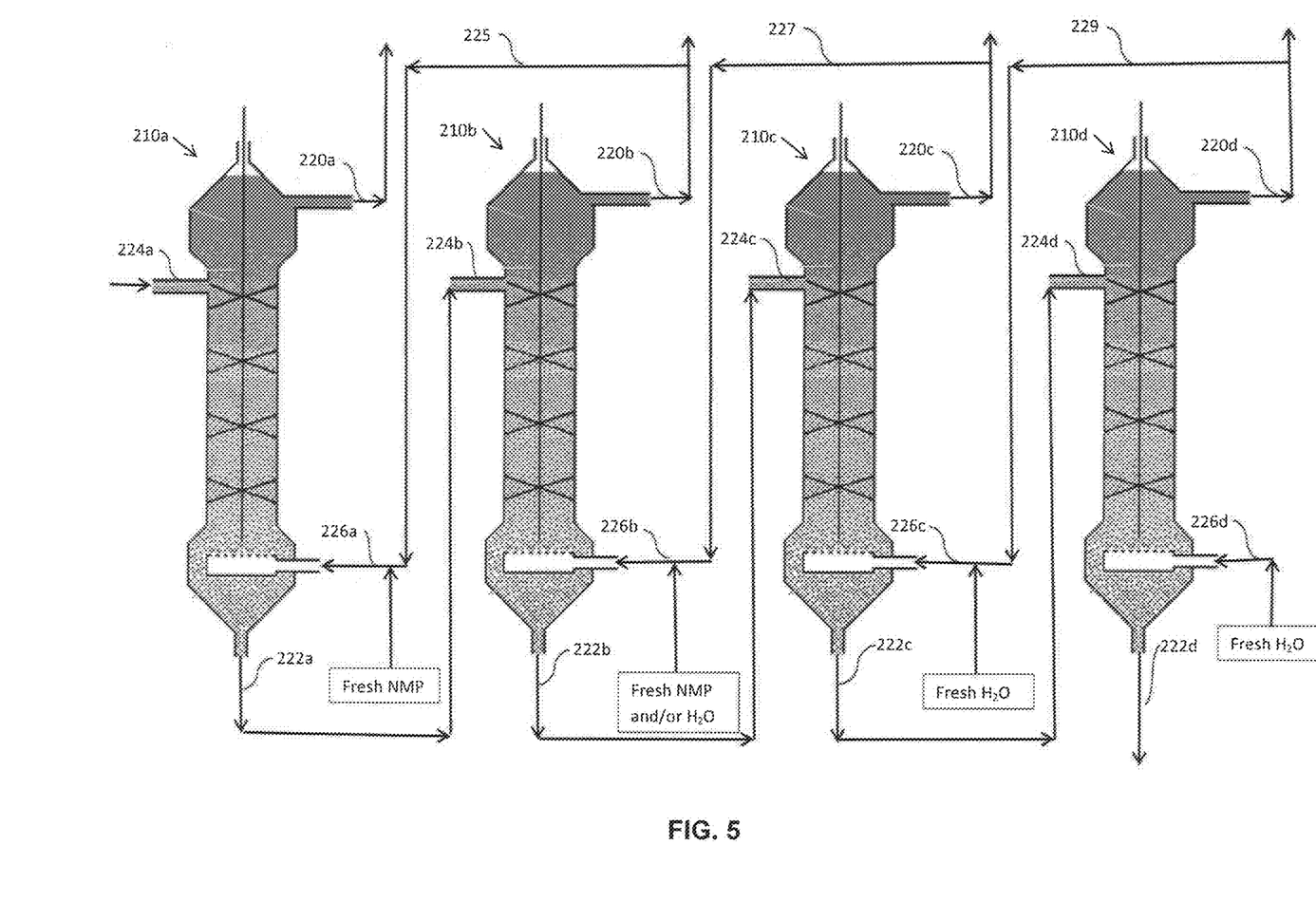
FIG. 5 illustrates another embodiment of a sedimentation system and method including four sedimentors.

One embodiment of a process including multiple sedimentors 210*a*, 210*b*, 210*c*, 210*d* with solvent recycle streams is illustrated in FIG. 5. A polymer slurry feed can be provided to the sedimentor 210*a* via slurry feed inlet 224*a*. The polymer slurry feed can include solid polyarylene sulfide product, an organic amide solvent, byproducts of the polymerization reaction such as salts, etc., and any other compounds of formation that are formed by or utilized in the polymerization reaction such as catalysts, co-solvents, unreacted monomers, etc.

NMP can be fed to the sedimentor 210*a* via liquid inlet 226*a* in the lower section of the sedimentor 210*a*. This input can include fresh NMP as well as NMP recovered and recycled from the second sedimentor as shown at 225. The solvent ratio for the first sedimentor can be from about 3 to about 4.5, with the proportion of NMP coming into inlet 226*a* via recycle stream 225 being from about 50% to about 90% of the total inlet stream.

The liquid outlet 220*a* at the upper section of the sedimentor 210*a* can carry the NMP wash product, which can include the NMP solvent and dissolved compounds of the polymer slurry feed. For example, unreacted dihaloaromatic monomer (e.g., p-dichlorobenzene) can be dissolved and removed from the product polymer by use of the countercurrent NMP flow.

The slurry flow from the outlet 222*a* of the first sedimentor 210*a* can include the solid polymer product and the organic amide solvent as a carrier. This slurry can then be utilized as the feed slurry for the second sedimentor 210*b*, and can be fed to the middle section of the second sedimentor 210*b* at slurry feed inlet 224*b*.

The solvent utilized in the second sedimentor 210*b* can be mixture that includes water and NMP in a ratio of from about 5 to about 10, for instance about 7. The solvent can be fed into the second sedimentor at inlet 226*b*. This solvent flow can include a recycle stream 227 from the third sedimentor 210*c* and a fresh solvent make-up feed, as shown. The fresh solvent make-up can include NMP and/or water as needed depending upon the contents of the recycle stream 227.

The countercurrent flow between the slurry and the solvent can transfer the solid product polyarylene sulfide from the organic solvent of the feed slurry to the aqueous solvent. Thus, the liquid pulled off of the sedimentor 210*b* at the liquid outlet 220*b* can include a large portion of organic solvent (NMP) that can be recycled back to the first sedimentor 210*a*. The outlet 222*b* can carry the solids in a liquid carrier that is now primarily water, though some additional compounds may remain in the slurry of the outlet flow 222*b*. The aqueous solvent of the second sedimentor 210*b* can also dissolve compounds such as salt byproducts from the product polymer and these compounds can be removed from the product polymer via the countercurrent flow. The organic solvent of the second sedimentor 210*b* can provide a second organic wash to the slurry and remove remaining contaminants that are soluble in the organic solvent. Thus the liquid removed from the sedimentor 210*b* at liquid outlet 220*b* can also include one or more dissolved compounds from the slurry fed at input 224*b*. This second sedimentor can operate at a solvent ratio of from about 1.5 to about 3.

In the third sedimentor 210c, the slurry feed from the second sedimentor can be fed via feed slurry inlet 224c. In this separation step, the liquid solvent fed to the lower section of the sedimentor 210c via the liquid inlet 226c can be pure water that includes fresh make-up water and water via the recycle stream 229 from the fourth sedimentor 210d. The counter current flow of the water can remove organic solvent and water-soluble contaminants from the feed slurry of the third sedimentor 210c. The liquid that is pulled off of the top of this third sedimentor 210c at liquid outlet 220c can be recycled via line 227 to form the solvent of the second sedimentor 210b. The solvent ratio for the third sedimentor can be from about 3 to about 4.5

This system also includes a fourth sedimentor 210d. The slurry pulled off of the third sedimentor 210c at outlet 222c can be fed to the fourth sedimentor at slurry inlet 224c. Sedimentor 210d can provide a fresh de-ionized water wash via the liquid inlet 226d. In one embodiment, the solvent of the fourth sedimentor 210d can also include an amount of acid. The dilute acid wash can alter the melt viscosity of the product polymer according to known practice. At least a portion of the liquid removed at outlet 220d can be recycled back to the third sedimentor 210c via recycle line 229 as shown. This stage can operate at a solvent ratio of from about 3 to about 4.5 and can remove residual water soluble components and remaining organic solvent.

The product pulled off of the bottom of the fourth sedimentor at solids outlet 222d can include the product polyarylene sulfide polymer and water, with insignificant amounts of other materials, such as the organic solvent of the original feed slurry. For instance, a product stream can include about 200 ppm or less of the original organic liquid carrier (e.g., NMP) and can include about 50 ppm or less of sodium chloride with respect to the amount of product polymer.

The product polymer can be dried according to standard methodology and can be utilized in forming products as are generally known in the art. For instance, a polyarylene sulfide can be combined with additives such as one or more of fillers (e.g., fibers and/or particulate fillers), coupling agents, an impact modifier, antimicrobials, pigments, lubricants, antioxidants, stabilizers, surfactants, waxes, flow promoters, solid solvents, and other materials added to enhance properties and processability. Such optional materials may be employed in mixture in conventional amounts.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A method for washing a polyarylene sulfide, the method comprising:
    introducing a first slurry into a first sedimentor, wherein the first slurry contains a solid polyarylene sulfide and a liquid;
    flowing a first solvent that contains an organic amide through the first sedimentor in a direction countercurrent to the first slurry, wherein the first slurry contacts the first solvent to form a second slurry;
    introducing the second slurry into a second sedimentor; and
    flowing a second solvent that contains water through the second sedimentor in a direction countercurrent to the second slurry, wherein the second slurry contacts the third solvent to form a third slurry, wherein at least one of the first sedimentor and the second sedimentor contain a fluidized bed that includes the solid polymer, the method further comprising monitoring and controlling the height of the fluidized bed.

2. The method of claim 1, wherein the solvent ratio of the first sedimentor is from about 1.5 to about 3.

3. The method of claim 1, wherein the solvent ratio of the first and/or the second sedimentor is from about 3 to about 4.5.

4. The method of claim 1, wherein the first slurry is introduced into a middle section of the first sedimentor via a slurry inlet, the slurry inlet being substantially tangent to a wall of the middle section.

5. The method of claim 1, wherein the polyarylene sulfide is a polyphenylene sulfide.

6. The method of claim 1, further comprising agitating the contents of the first sedimentor and the second sedimentor.

7. The method of claim 1, the first and the second sedimentor each have a middle section having a first and second height, respectively, wherein variation in the height of the fluidized bed during the process is less than about 10% of the height of the middle section.

8. The method of claim 1, further comprising heating the one or more components of the contents of at least one of the first sedimentor and the second sedimentor.

9. The method of claim 1, wherein a liquid that exits the second sedimentor is recycled to the first sedimentor.

10. The method of claim 1, further comprising introducing the third slurry into a third sedimentor and flowing a third solvent that contains water through the third sedimentor in a direction countercurrent to the third slurry.

11. The method of claim 10, further comprising agitating the contents of the third sedimentor.

12. The method of claim 10, further comprising heating the third solvent.

13. The method of claim 10, wherein the third sedimentor contains a fluidized bed that includes the polyarylene sulfide, the method further comprising monitoring and controlling the height of the fluidized bed.

14. The method of claim 13, the third sedimentor including a middle section having a height, wherein variation in the height of the fluidized bed during the process is less than about 10% of the height of the middle section.

15. The method of claim 10, wherein a liquid that exits the third sedimentor is recycled to the second sedimentor.

16. The method of claim 1, further comprising feeding a slurry to one or more additional sedimentors, the one or more additional sedimentors being in series with the first and second sedimentors.

17. The method of claim 1, wherein the liquid in the first slurry is N-methylpyrrolidone.

18. The method of claim 1, wherein the organic amide of the first solvent is N-methylpyrrolidone.

19. The method of claim 1, wherein the first solvent contains a mixture of the organic amide and water.

20. The method of claim 1, wherein the second solvent contains only water.

21. The method of claim 1, wherein the second solvent contains water and an acid.

22. The method of claim 10, wherein the third solvent contains only water.

23. The method of claim 1, further comprising removing a first liquid from the first sedimentor, the first liquid comprising an organic amide.

24. The method of claim 23, wherein the first liquid contains a mixture of the organic amide and water.

25. The method of claim 1, further comprising removing a second liquid from the second sedimentor, the second liquid comprising an organic amide.

26. The method of claim 25, wherein the first liquid contains a mixture of the organic amide and water.

27. A method for separating a solid polymer from multiple compounds comprising:
   introducing a first slurry into a first sedimentor, the first slurry including the solid polymer, a liquid carrier, and multiple compounds of formation of the polymer;
   introducing a first solvent into the first sedimentor, the first slurry flowing through the first sedimentor countercurrent to the first solvent within at least a portion of the first sedimentor, one or more compounds of formation of the polymer being soluble in the first solvent, the one or more first solvent soluble compounds transferring from the first slurry to the first solvent within the first sedimentor, the first slurry thus being transformed and forming a second slurry;
   introducing the second slurry into a second sedimentor wherein at least one of the first sedimentor and the second sedimentor contain a fluidized bed that includes the solid polymer,
   introducing a second solvent into the second sedimentor, the second solvent differing from the first solvent, the second slurry flowing through the second sedimentor countercurrent to the second solvent within at least a portion of the second sedimentor, one or more compounds of formation of the polymer being soluble in the second solvent, the one or more second solvent soluble compounds transferring from the second slurry to the second solvent within the second sedimentor, the second slurry thus being transformed and forming a third slurry; and
   monitoring and controlling the height of the fluidized bed in the first sedimentor, the second sedimentor, or both.

28. The method of claim 27, wherein the first slurry is introduced into a middle section of the first sedimentor via a slurry inlet, the slurry inlet being substantially tangent to a wall of the middle section.

29. The method of claim 27, wherein the polymer is a polyphenylene sulfide.

30. The method of claim 27, further comprising agitating the contents of the first sedimentor and the second sedimentor.

31. The method of claim 27, the first and the second sedimentor each having a middle section having a first and second height, respectively, wherein variation in the height of the fluidized bed during the process is less than about 10% of the height of the middle section.

32. The method of claim 27, further comprising heating the one or more components of the contents of at least one of the first sedimentor and the second sedimentor.

33. The method of claim 27, wherein a liquid that exits the second sedimentor is recycled to the first sedimentor.

34. The method of claim 27, further comprising introducing the third slurry into a third sedimentor and introducing a third solvent into the third sedimentor, the third slurry flowing through the third sedimentor countercurrent to the third solvent within at least a portion of the third sedimentor.

35. The method of claim 34, further comprising agitating the contents of the third sedimentor.

36. The method of claim 34, further comprising heating the third solvent.

37. The method of claim 34, wherein the third sedimentor contains a fluidized bed that includes the solid polymer, the method further comprising monitoring and controlling the height of the fluidized bed.

38. The method of claim 37, the third sedimentor including a middle section having a height, wherein variation in the height of the fluidized bed during the process is less than about 10% of the height of the middle section.

39. The method of claim 34, wherein a liquid that exits the third sedimentor is recycled to the second sedimentor.

40. The method of claim 27, further comprising feeding a slurry to one or more additional sedimentors, the one or more additional sedimentors being in series with the first and second sedimentors.

41. The method of claim 27, wherein the liquid carrier in the first slurry is N-methylpyrrolidone.

42. The method of claim 27, wherein the first solvent contains N-methylpyrrolidone.

43. The method of claim 42, wherein the first solvent contains a mixture of the N-methylpyrrolidone and water.

44. The method of claim 27, wherein the second solvent contains only water.

45. The method of claim 27, wherein the second solvent contains water and an acid.

46. The method of claim 34, wherein the third solvent contains only water.

* * * * *